United States Patent [19]

Janin et al.

[11] 3,919,263
[45] Nov. 11, 1975

[54] PROCESS FOR THE PREPARATION OF ANTHRAQUINONE

[75] Inventors: Raymond Janin, Irigny; Leon Krumenacker, Serezin du Rhone, both of France

[73] Assignee: Rhone-Poulenc S.A., Paris, France

[22] Filed: May 8, 1974

[21] Appl. No.: 468,139

[30] Foreign Application Priority Data
  May 11, 1973  France .................. 73.17155

[52] U.S. Cl. .............. 260/385; 252/441; 252/442
[51] Int. Cl.² .................. C07C 49/68; C09B 1/06
[58] Field of Search ............................ 260/385

[56] References Cited
UNITED STATES PATENTS

| | | | |
|---|---|---|---|
| 1,787,416 | 12/1930 | Wohl | 260/385 |
| 1,787,417 | 12/1930 | Wohl | 260/385 |
| 1,880,322 | 10/1932 | Jaeger | 260/385 |
| 2,643,269 | 6/1953 | Augustine | 260/385 X |
| 2,824,881 | 2/1958 | Wettstein | 260/385 |

OTHER PUBLICATIONS

Crocker et al., "J. Chem. Soc.," 1970(c), pp. 1982–1986, 1970.

*Primary Examiner*—Paul F. Shaver
*Attorney, Agent, or Firm*—Cushman, Darby & Cushman

[57] ABSTRACT

A simple process for preparing anthraquinone in good yield from anthracene is described, which process comprises oxidising anthracene in the liquid phase by means of oxygen or an oxygen-containing gas, in an inert organic solvent, and in the presence of cupric bromide.

12 Claims, No Drawings

PROCESS FOR THE PREPARATION OF ANTHRAQUINONE

The present invention relates to a process for the preparation of anthraquinone by oxidation of anthracene by means of oxygen or an oxygen-containing gas.

Anthraquinone is a compound of great industrial value, particularly in the manufacture of dyestuffs. Various processes for the preparation of anthraquinone have been proposed, especially from phthalic anhydride (condensation with benzene in the presence of anhydrous aluminium chloride to form benzoylbenzoic acid which is converted to anthraquinone with sulphuric acid). It has also been proposed to oxidise anthracene to anthraquinone in the liquid phase by means of an oxidising agent such as nitric acid or a dichromate, or in the vapour phase by means of oxygen or air in the presence of a catalyst such as vanadium pentoxide. These various processes are not completely satisfactory either because of the reagents employed or because of the reaction conditions; it is clearly important to have available a simple process for the oxidation of anthracene in the liquid phase by means of oxygen or an oxygen-containing gas. During an investigation into the halogenation of aromatic compounds, especially phenols and amines, by means of cupric chloride in the presence of oxygen and hydrochloric acid in 1,5-dimethoxy-3-oxa-pentane (diglyme), H.P. CROCKER and R. WALSER (J. Chem. Soc., 1970, 1982 – 1986) mentioned the formation of anthraquinone from anthracene, but it was found that, under these conditions, the halogenation reaction leads predominantly to the formation of 9-chloroanthracene which deprives such a process of any value as an industrial method for the preparation of anthraquinone.

According to the present invention, there is provided a process for the preparation of anthraquinone by oxidation of anthracene in the liquid phase by means of oxygen or an oxygen-containing gas in the presence of an inert organic diluent and in the presence of cupric bromide.

It has been found, surprisingly, that the replacement of cupric chloride by cupric bromide makes it possible to alter the course of the reaction so that anthraquinone is the preponderant product and, in some cases, depending on the solvent used, so that anthraquinone is practically the only product, the formation of 9-bromoanthracene being very slight and non existant.

The diluents which are particularly suitable are linear or branched saturated aliphatic alcohols containing 1 to 10 carbon atoms, and compounds of the general formula:

  (1)

in which $R_1$ and $R_2$, which may be identical or different, denote a hydrogen atom or a linear or branched alkyl radical containing 1 to 5 carbon atoms, R denotes a linear or branched alkylene radical containing 1 to 10 carbon atoms and n is an integer from up to 3.

More specifically, $R_1$ and $R_2$ can be, for example, a methyl, ethyl or propyl radical and R can be, for example, an ethylene, propylene, tetramethylene, pentamethylene, hexamethylene or octamethylene radical.

Specific examples of diluents which may be used include methanol, ethanol, propanol, isopropanol, 1-butanol, isoamyl alcohol, tertiary amyl alcohol, n-pentanol, 1-hexanol, the octanols, ethylene glycol, 2-methoxyethanol, 1,2-dimethoxy-ethane, propane-1,2-diol, propane-1,3-diol, 3-methoxy-1-propanol, 1,3-dimethoxy-propane, 2-methyl-propane-1,3-diol, 2,2-dimethyl-propane-1,3-diol, butane-1,4-diol, butane-2,3-diol, pentane-1,5--diol, hexane-1,6-diol, diethylene glycol, dipropylene glycol, tripropylene glycol and 1,5-dimethoxy-3-oxa-pentane. Amongst these the non-condensed glycols are preferred. In fact, it has been found that the combination of cupric bromide and an aliphatic glycol, especially ethylene glycol, makes it possible to obtain excellent yields of anthraquinone.

It is, of course, possible to use a mixture of 2 or more organic diluents; it is also possible for the reaction mixture to contain water.

It has also been found, and this forms a further feature of the process of the present invention, that it is advantageous to carry out the process in the presence of one or more compounds referred to hereafter as "activators", namely inorganic acids, with the exception of hydrochloric acid, iron halides (chlorides, bromides, fluorides and iodides), aluminium halides and halides of elements from Groups 3A, 4A and 5A of the Periodic Table as given in "Handbook of Chemistry and Physics", 45th edition, 1964, Physics", page B-2. In fact, the presence of these compounds results in an increase in the reaction rate. Acids which have a pK in aqueous solution of less than 2, and preferably of at most 1, are the inorganic acids which may be used, for example sulphuric acid, perchloric acid, pyrophosphoric acid and hydrobromic acid. Hydrobromic acid is particularly suitable, both because of its effect on the reaction rate and because of the fact that an anion which is already present in the medium is used.

Amongst the halides used as activators, there may be mentioned ferrous and ferric chlorides, ferrous and ferric bromides, aluminium chloride, aluminium bromide, aluminium fluoride, boron trifluoride, antimony pentachloride, antimony trichloride, antimony tribromide, antimony trifluoride and pentafluoride, antimony pentaiodide, arsenic tribromide, arsenic trichloride, arsenic pentafluoride, arsenic trifluoride, arsenic triiodide and pentaiodide, and bismuth tetrachloride and trichloride. Amongst these various halogenated derivatives, those of antimony generally produce the most pronounced effect on the kinetics of the oxidation reaction, so that they form a preferred class of activators.

Although it is preferable, for reasons of convenience, to employ cupric bromide directly, it is possible to form it "in situ" from cuprous bromide.

The quantity of cupric bromide, expressed in mols per mol of anthracene, can vary within wide limits. Thus, for example, it can be at least 1 ¼ $10^{-5}$ and can be as much as 2 mols per mol of anthracene. The latter value can be exceeded but, in general, it is not necessary to exceed 1 mol of cupric bromide per mol of anthracene.

The quantity of activator, which may be present, can also vary within wide limits, depending on the nature of the compound employed. In general terms, it can be at least 1 ¼ $10^{-5}$ mol and can be as much as 10 mols per mol of anthracene; however, in the case of antimony halides, it is generally not necessary to exceed 1 mol per mol of anthracene.

The temperature at which the reaction is carried out suitably varises from 20 to 200C. A temperature of from 20 to 180C is generally very suitable. The oxidation is suitably carried out under a partial pressure of oxygen of 0.1 to 20 bars. When the diluent or the activator such as boron trifluoride, arsenic trifluoride or arsenic pentafluoride, is gaseous at the chosen temperature, it is preferable to work under pressure.

In addition to oxygen, it is possible to use mixtures of oxygen with inert gases, such as nitrogen, as the oxidising gas. Typically, air, optionally enriched with oxygen, can be used.

The process according to the present invention is particularly simple to effect on a technical scale and can be carried out continuously.

The following Examples further illustrate the present invention.

EXAMPLE 1

120 cm³ of ethylene glycol, 7.12 g of anthracene (4 ¼ $10^{-2}$ mol) and 1.4 g of cupric bromide (6.2 ¼ $10^{-3}$ mol) are introduced into a 250 cm³ flask equipped with a reflux condenser, a thermometer, a dip tube for introducing gas, a stirring systen and a thermoregulated heating device; then the contents of the flask are heated to 140C with stirring. A stream of oxygen is then introduced into the reaction medium at a rate of 6 to 8 l/hour under normal conditions of pressure and temperature. These conditions are maintained for 8 hours and then the contents of the flask are cooled to 20C and poured into a sufficient amount of water to bring the total volume to 1 liter; this causes the dissolved anthracene to precipitate. The mixture is left to stand at ambient temperature for 12 hours and is then filtered through sintered glass. The precipitate obtained is dried to constant weight over $P_2O_5$. In this way, 8.02 g of a product are isolated, in which 4 g of anthracene (56% of the anthracene introduced) and 3.28 g of anthraquinone (corresponding to 41.5% of the anthracene introduced) are measured by chromatography on alumina. The degree of conversion is 44% and the yield of anthraquinone relative to the anthracene converted is 94.5%, No 9-bromo-anthracene formed during the oxidation.

EXAMPLES 2 TO 12

Using the procedure described in Example 1, a series of tests was carried out under the conditions which are given in the following Table, as are the results obtained.

| EX. | Anthracene in g | CuBr₂ in g | Co-catalyst Nature | Co-catalyst Weight or volume | Solvent Nature | Solvent Volume | Duration in hours | T. in C | Degree of conversion in % | Anthraquinone Yield in % | 9-bromo-anthracene yield in % |
|---|---|---|---|---|---|---|---|---|---|---|---|
| 2 | 7.12 | 1.4 | HBr | 2 cm³ of 66% strength by weight | Ethylene glycol | 116 cm³ | 7 | 82 | 24 | 74 | 0 |
| 3 | | 4.42 | | | | | 8 | | 32.5 | 84.5 | 10.8 |
| 4 | | 1.4 | | 10 cm³ of 66% strength by weight | | | | | 38.3 | 87.5 | 8.6 |
| 5 | | 4.42 | | | | | | | 55.5 | 95 | 4.5 |
| 6 | | 1.4 | | 2 cm³ of 66% strength by weight | | | | 100 | 49.5 | 89.5 | 6 |
| 7 | | | | | Propane-1,2-diol | | | 82 | 21.9 | 81.5 | traces |
| 8 | | | | | diglyme | | | | 75.2 | 74 | 25.8 |
| 9 | | | SbCl₅ | 0.46 g | ethylene glycol | | | 140 | 77 | 97.5 | 0 |
| 10 | | | AlCl₃ | 0.2 g | ethylene glycol | 120 | | | 23 | 99 | 0 |
| 11 | | | FeCl₃ | 0.25 g | | | | | 55 | 99 | 0 |
| 12 | | | H₂SO₄ | 5 cm³ of 95% strength by weight | | 110 | | | 14.8 | 98 | 0 |

By way of comparison, 7.12 g of anthracene, 6.8 g of cupric chloride dihydrate, 4 cm³ of fuming hydrochloric acid and 116cm³ of diglyme were introduced into the apparatus described in Example 1. The contents of the flask are heated at 80C for 8 hours and then cooled to 20C, and the reaction mixture is treated as in Example 1. Anthracene (15.2% by weight of the anthracene introduced), 9-chloro-anthracene representing 38.6% of the anthracene introduced and anthraquinone representing 36% of the anthracene introduced are measured in the precipitate obtained.

The degree of conversion of anthracene is thus 84.8% and the yields of 9-chloro-anthracene and anthraquinone are, respectively, 44.5% and 42.5%.

EXAMPLE 13

120 cm³ of ethylene glycol, 7.12 g of anthracene and 1.4 g of cupric bromide are introduced into a 250 cm³ autoclave made of stainless steel lined with tantalum, and then the apparatus is closed, 22 bars of air are introduced and the temperature is raised to 140C. These conditions are maintained for 5 hours, the apparatus is cooled and then the pressure is released. The reaction mixture is treated as in Example 1. 8.53 g of a product are isolated, in which anthracene (18.4% of the quantity introduced) and anthraquinone representing 61% of the anthracene introduced are measured.

The degree of conversion of anthracene is 81.6% and the yield of anthraquinone is 75% relative to the converted anthracene. No bromo-anthracene was detected in the products formed.

EXAMPLE 14

The procedure of the preceding Example is followed, but 0.2 cm³ of SbCl₅ is introduced in addition; after reacting for 1 hour 35 minutes, 8.30 g of a product containing anthracene, 7% of the quantity introduced, and anthraquinone corresponding to 92.5% of the hydrocarbon introduced, are isolated.

EXAMPLE 16

The experiment of Example 2 is repeated, and then, at the end of the reaction, the filtrate is recovered and is introduced into the apparatus described in Example 1, 0.4 cm³ of hydrobromic acid and 7.12 g of anthracene are added and the whole is heated at 82C for 8 hours. After treatment as in Example 1, 7.32 g of a product containing 81.5% of the anthracene introduced and anthraquinone corresponding to 17% of the hydrocarbon introduced (corresponding to a yield of 92% relative to the converted anthracene) are recovered.

EXAMPLE 17

The procedure of Example 1 is followed, with the following compounds and under the following conditions.

| | |
|---|---|
| CuBr₂ | 4.46 g |
| anthracene | 7.12 g |
| ethylene glycol | 88 cm³ |
| water | 22 cm³ |
| temperature | 100C |
| duration | 8 hrs. |

At the end of the reaction, 7.67 g of a product containing 57% of the anthracene introduced (degree of conversion 43%) and anthraquinone representing 43% of the anthracene introduced, are isolated.

We claim:

1. In a process for the preparation of anthraquinone which comprises oxidising anthracene in the liquid phase by means of oxygen or an oxygen-containing gas, in an inert organic solvent and in the presence of a cupric salt, the improvement wherein the cupric salt is cupric bromide and the inert organic solvent is a saturated aliphatic alcohol or a compound of the general formula:

$$R_1O + R^1 - O \cdot_n R_2 \quad (1)$$

in which $R_1$ and $R_2$, which may be identical or different, denote a hydrogen atom or a linear or branched alkyl radical containing up to 5 carbon atoms, R denotes a linear or branched alkylene radical containing up to 10 carbon atoms, and n is an integer from 1 to 3.

2. Process according to claim 1, which is carried out in the presence of at least one activator which is selected from hydrobromic or sulphuric, acid an iron halide, aluminium halide, boron trifluoride, an antimony halide, an arsenic halide and a bismuth halide.

3. Process according to claim 2, in which the activator is hydrobromic acid or sulphuric acid.

4. Process according to claim 2, in which the activator is an iron chloride, aluminium chloride or antimony pentachloride.

5. Process according to claim 1 in which the inert organic solvent is a compound of the general formula (1).

6. Process according to claim 1, in which the solvent is ethylene glycol, propanediol or 1,5-dimethyoxy-3-oxa-pentane.

7. Process according to claim 1 in which the reaction is carried out at a temperature from 20 to 200C with a partial pressure of oxygen from 0.1 to 20 bars.

8. Process according to claim 1, in which the cupric bromide is present in an amount of at least 1 ¼ 10⁻⁵ mol per mol of anthracene.

9. Process according to claim 2, in which the activator is present in an amount of at least 1 ¼ 10⁻⁵ mol per mol of anthracene.

10. Process according to claim 1, in which anthracene is oxidised in the presence of cupric bromide and hydrobromic acid or an antimony halide in ethylene glycol.

11. Process according to claim 5 in which n is 1.

12. Process according to claim 5 in which $R_1$ and $R_2$ denote a hydrogen atom.

* * * * *